(12) United States Patent
Nishio

(10) Patent No.: US 11,207,929 B2
(45) Date of Patent: Dec. 28, 2021

(54) PNEUMATIC TIRE

(71) Applicant: The Yokohama Rubber Co., LTD., Tokyo (JP)

(72) Inventor: Koji Nishio, Hiratsuka (JP)

(73) Assignee: The Yokohama Rubber Co., LTD.

( * ) Notice: Subject to any disclaimer, the term of this patent is extended or adjusted under 35 U.S.C. 154(b) by 260 days.

(21) Appl. No.: 16/065,035

(22) PCT Filed: Dec. 14, 2016

(86) PCT No.: PCT/JP2016/087303
§ 371 (c)(1),
(2) Date: Jun. 21, 2018

(87) PCT Pub. No.: WO2017/110636
PCT Pub. Date: Jun. 29, 2017

(65) Prior Publication Data
US 2019/0054777 A1 Feb. 21, 2019

(30) Foreign Application Priority Data
Dec. 25, 2015 (JP) .............................. JP2015-255268

(51) Int. Cl.
*B60C 15/00* (2006.01)
*B60C 15/06* (2006.01)
(Continued)

(52) U.S. Cl.
CPC ........ *B60C 15/0236* (2013.01); *B60C 1/0025* (2013.01); *B60C 15/00* (2013.01);
(Continued)

(58) Field of Classification Search
CPC ..... B60C 15/00; B60C 15/0009; B60C 15/06; B60C 15/0603; B60C 15/0607;
(Continued)

(56) References Cited

U.S. PATENT DOCUMENTS 6,000,452 A * 12/1999 Sumiya .................. B60C 15/06
152/454
8,232,340 B2 * 7/2012 Miyazaki .................. B60C 1/00
524/451
2008/0093001 A1  4/2008 Ono

FOREIGN PATENT DOCUMENTS

GB        1592708        * 7/1981
JP        H03-054007       3/1991
(Continued)

OTHER PUBLICATIONS

Machine translation of JP 2005-112042, 2005.*
(Continued)

*Primary Examiner* — Justin R Fischer
(74) *Attorney, Agent, or Firm* — Thorpe North & Western

(57) ABSTRACT

A pneumatic tire mountable on a 15° tapered specified rim includes a bead core, a carcass, a steel cord reinforcing layer, a bead rubber layer, and a first reinforcing rubber layer. A distance from a second line segment to a third line segment is from 4 mm to 12 mm, a complex modulus of the first reinforcing rubber layer is from 6 MPa to 10 MPa, an elongation at break of the first reinforcing rubber layer is from 300% to 450%, a complex modulus of the second reinforcing rubber layer is from 10 MPa to 15 MPa, and a complex modulus of a shock absorbing rubber layer is from 2 MPa to 6 MPa.

4 Claims, 4 Drawing Sheets

(51) Int. Cl.
*B60C 15/02* (2006.01)
*B60C 1/00* (2006.01)
*B60C 15/024* (2006.01)
*B60C 15/04* (2006.01)
*B60C 3/04* (2006.01)
*B60C 17/00* (2006.01)

(52) U.S. Cl.
CPC ........ *B60C 15/0081* (2013.01); *B60C 15/024* (2013.01); *B60C 15/06* (2013.01); *B60C 15/0603* (2013.01); *B60C 15/0607* (2013.01); *B60C 15/0628* (2013.01); *B60C 15/0635* (2013.01); *B60C 1/0016* (2013.01); *B60C 3/04* (2013.01); *B60C 17/0036* (2013.01); *B60C 2015/0245* (2013.01); *B60C 2015/048* (2013.01); *B60C 2015/0614* (2013.01); *B60C 2015/0621* (2013.01); *B60C 2015/0625* (2013.01); *B60C 2015/0692* (2013.01); *B60C 2200/06* (2013.01)

(58) Field of Classification Search
CPC .... B60C 2015/0614; B60C 2015/0625; B60C 2015/0628
See application file for complete search history.

(56) References Cited

FOREIGN PATENT DOCUMENTS

| | | | |
|---|---|---|---|
| JP | 03204314 | * | 9/1991 |
| JP | 2855327 | | 2/1999 |
| JP | 11-189018 | * | 7/1999 |
| JP | 2002-178724 | | 6/2002 |
| JP | 2003-063217 | | 3/2003 |
| JP | 2005-112042 | * | 4/2005 |
| JP | 2008-062662 | | 3/2008 |
| JP | 2009-227236 | | 10/2009 |
| JP | 2010-179781 | | 8/2010 |
| JP | 2012-106531 | | 6/2012 |

OTHER PUBLICATIONS

Machine translation of JP 03204314, 1991.*
International Search Report for International Application No. PCT/JP2016/087303 dated Mar. 21, 2017, 4 pages, Japan.

* cited by examiner

| | CONVENTIONAL EXAMPLE 1 | CONVENTIONAL EXAMPLE 2 | COMPARATIVE EXAMPLE 1 | COMPARATIVE EXAMPLE 2 | COMPARATIVE EXAMPLE 3 | COMPARATIVE EXAMPLE 4 | EXAMPLE 1 | EXAMPLE 2 | EXAMPLE 3 |
|---|---|---|---|---|---|---|---|---|---|
| DISTANCE A (mm) | 0 | 0 | 10 | 10 | 10 | 10 | 10 | 8 | 12 |
| COMPLEX MODULUS OF FIRST REINFORCING RUBBER LAYER L (MPa) | 8 | 4 | 4 | 4 | 4 | 4 | 8 | 8 | 8 |
| ELONGATION AT BREAK OF FIRST REINFORCING RUBBER LAYER L (%) | 400 | 550 | 550 | 550 | 550 | 550 | 400 | 400 | 400 |
| COMPLEX MODULUS OF SECOND REINFORCING RUBBER LAYER K1 (MPa) | 13 | 7 | 13 | 7 | 7 | 7 | 13 | 13 | 13 |
| COMPLEX MODULUS OF SHOCK ABSORBING RUBBER LAYER K2 (MPa) | 4 | 10 | 4 | 4 | 4 | 10 | 4 | 4 | 4 |
| RUBBER ADJACENT TO SECOND INTERSECTION POINT R | SECOND REINFORCING RUBBER LAYER K1 | SHOCK ABSORBING RUBBER LAYER K2 | SECOND REINFORCING RUBBER LAYER K1 | SECOND REINFORCING RUBBER LAYER K1 | SECOND REINFORCING RUBBER LAYER K1 | SHOCK ABSORBING RUBBER LAYER K2 | SECOND REINFORCING RUBBER LAYER K1 | SECOND REINFORCING RUBBER LAYER K1 | SECOND REINFORCING RUBBER LAYER K1 |
| CARCASS TURNED-UP SEPARATION RESISTANCE PERFORMANCE | 90 | 50 | 160 | 140 | 130 | 120 | 200 | 170 | 180 |
| BEAD BURST POSSIBILITY | NONE | HIGH | NONE | SOME | SOME | HIGH | NONE | NONE | NONE |

FIG. 4

PNEUMATIC TIRE

TECHNICAL FIELD

The present technology relates to a pneumatic tire.

BACKGROUND ART

A pneumatic tire includes a bead portion with a bead core on either side in the tire lateral direction. A pneumatic tire is mounted on a rim wheel by the bead portion and the rim wheel engaging. Japan Patent No. 2855327 describes technology designed to improve the durability of a bead portion via a specific relationship between a bead core (bead wire) and a bead base portion.

In a pneumatic tire, a carcass folded back portion is disposed in a bead portion. However, crack generation from an edge of the carcass folded back portion may occur, and there is a demand for a countermeasure.

SUMMARY

The present technology provides a pneumatic tire that can provide suppression of crack generation from an edge of a carcass folded back portion.

A pneumatic tire according to an embodiment of the present technology is a pneumatic tire mountable on a 15° tapered specified rim, the pneumatic tire including:

a pair of bead portions disposed on either side of a tire equatorial plane in a tire lateral direction;

a bead core provided in each of the pair of bead portions;

a carcass supported by the pair of bead cores, the carcass including a carcass body portion and a carcass folded back portion formed by the carcass folding back at the bead core;

a steel cord reinforcing layer disposed on an outer surface of the carcass folded back at the bead core;

a bead rubber layer with at least a portion thereof disposed between the carcass body portion and the carcass folded back portion; and a first reinforcing rubber layer located adjacent to an outer edge portion of the steel cord reinforcing layer located outward in the tire radial direction and an outer edge portion of the carcass folded back portion located outward in the tire radial direction, the first reinforcing rubber layer extending outward in the tire radial direction;

the bead rubber layer including a second reinforcing rubber layer located adjacent to the bead core and a shock absorbing rubber layer located adjacent to the second reinforcing rubber layer, the shock absorbing rubber layer disposed between the carcass body portion and the first reinforcing rubber layer;

when the pneumatic tire being not mounted on the specified rim, a distance from a second line segment to a third line segment being from 4 mm to 12 mm, a complex modulus of the first reinforcing rubber layer being from 6 MPa to 10 MPa, an elongation at break of the first reinforcing rubber layer being from 300% to 450%, a complex modulus of the second reinforcing rubber layer being from 10 MPa to 15 MPa, and a complex modulus of the shock absorbing rubber layer being from 2 MPa to 6 MPa, wherein a first line segment passing through an outermost projecting point of the bead core in the tire lateral direction and being parallel with a longest side of the bead core, a side of a bead base portion closer to a bead heel, where the bead base portion is a portion of the bead portion and configured to come into contact with the specified rim, a curved line of a tire outer surface, where the tire outer surface is a portion of the bead portion and is located outward from the bead base portion in the tire lateral direction, a first intersection point of the side and the curved line, the second line segment passing through the first intersection point and being perpendicular to the first line segment, and the third line segment passing through the projecting point and being perpendicular to the first line segment are specified.

In a pneumatic tire according to an embodiment of the present technology, preferably, a second intersection point of the first line segment and the carcass folded back portion is specified at the second reinforcing rubber layer.

The present technology provides a pneumatic tire that can provide suppression of crack generation from an edge of a carcass folded back portion.

BRIEF DESCRIPTION OF DRAWINGS

FIG. 4 is a table listing the results of performance tests of pneumatic tires according to present embodiments.

DETAILED DESCRIPTION

Embodiments of the present technology will be described with reference to the drawings. However, the present technology is not limited to those embodiments. Additionally, constituents described in the embodiments below can be combined, and one or more constituents can be omitted.

Herein, "tire lateral direction" refers to the direction that is parallel with a tire rotation axis of a pneumatic tire. "Inward in the tire lateral direction" refers to the direction toward a tire equatorial plane in the tire lateral direction. "Outward in the tire lateral direction" refers to the direction away from the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

"Tire equatorial plane" refers to a plane orthogonal to the tire rotational axis that passes through the center in the tire lateral direction. "Tire equatorial line" refers to a centerline where the tire equatorial plane and the surface of a tread portion of the pneumatic tire meet.

Figure 1:
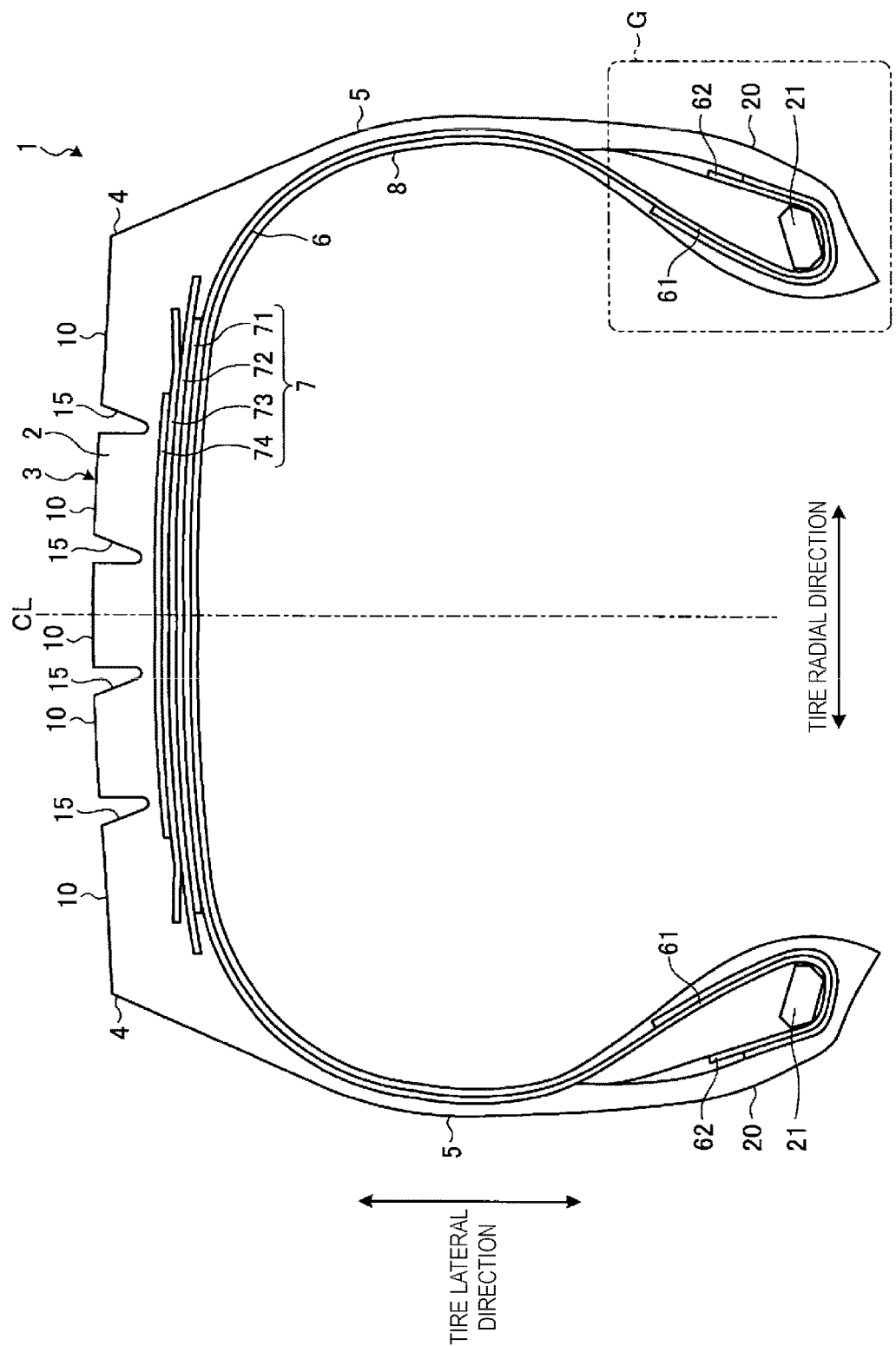
FIG. 1 is a meridian cross-sectional view illustrating a main portion of a pneumatic tire according to a present embodiment.

FIG. 1 is a meridian cross-sectional view illustrating a main portion of a tire 1 according to the present embodiment. "Meridian cross-section" refers to a cross section that passes through the tire rotation axis. The tire 1 is a pneumatic tire and a tubeless tire. The tire 1 is a heavy duty tire mountable on a truck or bus. A tire (heavy duty tire) for a truck or bus refers to a tire specified in Chapter C of the JATMA Year Book (Standards of The Japan Automobile Tyre Manufacturers Association, Inc.) published by the Japan Automobile Tyre Manufacturers Association, Inc. (JATMA). Note that the tire 1 may be mountable on a passenger vehicle or may be mountable on a light truck.

The tire 1 illustrated in FIG. 1, as viewed in a meridian cross-section, is provided with a tread portion 2 in the outermost portion in the tire radial direction. The surface of the tread portion 2, i.e., the portion that comes into contact with the road surface when a vehicle mounted with the tire 1 travels, is formed as a tread surface 3. A plurality of circumferential main grooves 15 extending in the tire circumferential direction and a plurality of lug grooves (not illustrated) intersecting the circumferential main grooves 15 are formed in the tread surface 3. A plurality of land portions 10 are defined in the tread surface 3 by the circumferential main grooves 15 and the lug grooves. Note that the number of circumferential main grooves 15, the intervals between the lug grooves in the tire circumferential direction, the length and angle of the lug grooves, the groove width and the groove depth of the each grooves, and the like are preferably set as appropriate. In other words, a tread pattern formed in the tread surface 3 is preferably set as appropriate.

Both ends of the tread portion 2 in the tire lateral direction are formed as shoulder portions 4. Sidewall portions 5 are disposed from the shoulder portions 4 to predetermined positions inward in the tire radial direction. In other words, the sidewall portions 5 are disposed at two positions on either side of the pneumatic tire 1 in the tire lateral direction.

Furthermore, a bead portion 20 is located inward of each sidewall portion 5 in the tire radial direction. The bead portions 20 are disposed at two positions on either side of a tire equatorial plane CL in a similar manner to that of the sidewall portions 5. In other words, the pair of bead portions 20 are disposed on either side of the tire equatorial plane CL in the tire lateral direction. The pair of bead portions 20 each include a bead core 21. The bead core 21 is formed by winding a bead wire, which is a steel wire, into an annular shape.

The bead portion 20 is configured to be mountable on a 15° tapered specified rim. Here, "specified rim" refers to an "applicable rim" defined by JATMA, a "Design Rim" defined by the Tire and Rim Association (TRA), or a "Measuring Rim" defined by the European Tyre and Rim Technical Organisation (ETRTO). In other words, the tire 1 according to the present embodiment can be mounted on the specified rim including an engaging portion for the bead portion 20 which is inclined with a 15° inclination angle with respect to the rotation axis.

A belt layer 7 is provided inward of the tread portion 2 in the tire radial direction. The belt layer 7, for example, has a multilayer structure including layered four belts 71, 72, 73, 74, the belts being made by a process of covering a plurality of belt cords made of steel or an organic fiber material, such as polyester, rayon, and nylon, and then a rolling process. Furthermore, the belts 71, 72, 73, 74 have different set of belt cords defined as inclination angles of the fiber direction of the belt cords with respect to the tire circumferential direction, and the belts are configured to be layered so that the fiber directions of the belt cords intersect each other, i.e., a crossply structure.

A carcass 6 including cords of radial ply is continuously provided inward of the belt layer 7 in the tire radial direction and along a side of the sidewall portion 5 closer to the tire equatorial plane CL. The carcass 6 is supported by the pair of bead cores 21. The carcass 6 has a single layer structure made of one carcass ply or a multilayer structure made of a plurality of carcass plies, and extends between the bead cores 21 disposed on either side in the tire lateral direction in a toroidal form, forming the framework of the tire. Specifically, the carcass 6 is disposed from one bead portion 20 to the other bead portion 20 where the set of the bead portions 20 is located on either side in the tire lateral direction, and turns back outward in the tire lateral direction along the bead cores 21 at the bead portions 20, wrapping around the bead cores 21. In other words, the carcass 6 is folded back around the bead cores 21 at the bead portions 20, so that the carcass 6 is disposed inward of the bead cores 21 in the tire lateral direction and runs inward of the bead core 21 in the tire radial direction and then outward of the bead core 21 in the tire lateral direction. The carcass ply of the carcass 6 disposed in this manner is made by a process of covering a plurality of carcass cords made of steel or an organic fiber material, such as aramid, nylon, polyester, and rayon, and then a rolling process.

Hereinafter, the carcass 6 that folds back at the bead core 21 located at the bead portion 20 includes a portion disposed inward from the bead core 21 in the tire lateral direction referred to as a carcass body portion 61, as appropriate, and a portion formed by the carcass 6 folding back at the bead core 21 disposed outward from the bead core 21 in the tire lateral direction referred to as a carcass folded back portion 62, as appropriate.

Additionally, an innerliner 8 is formed along the carcass 6 on the inner side of the carcass 6 or on the interior side of the tire 1 from the carcass 6.

Figure 2:
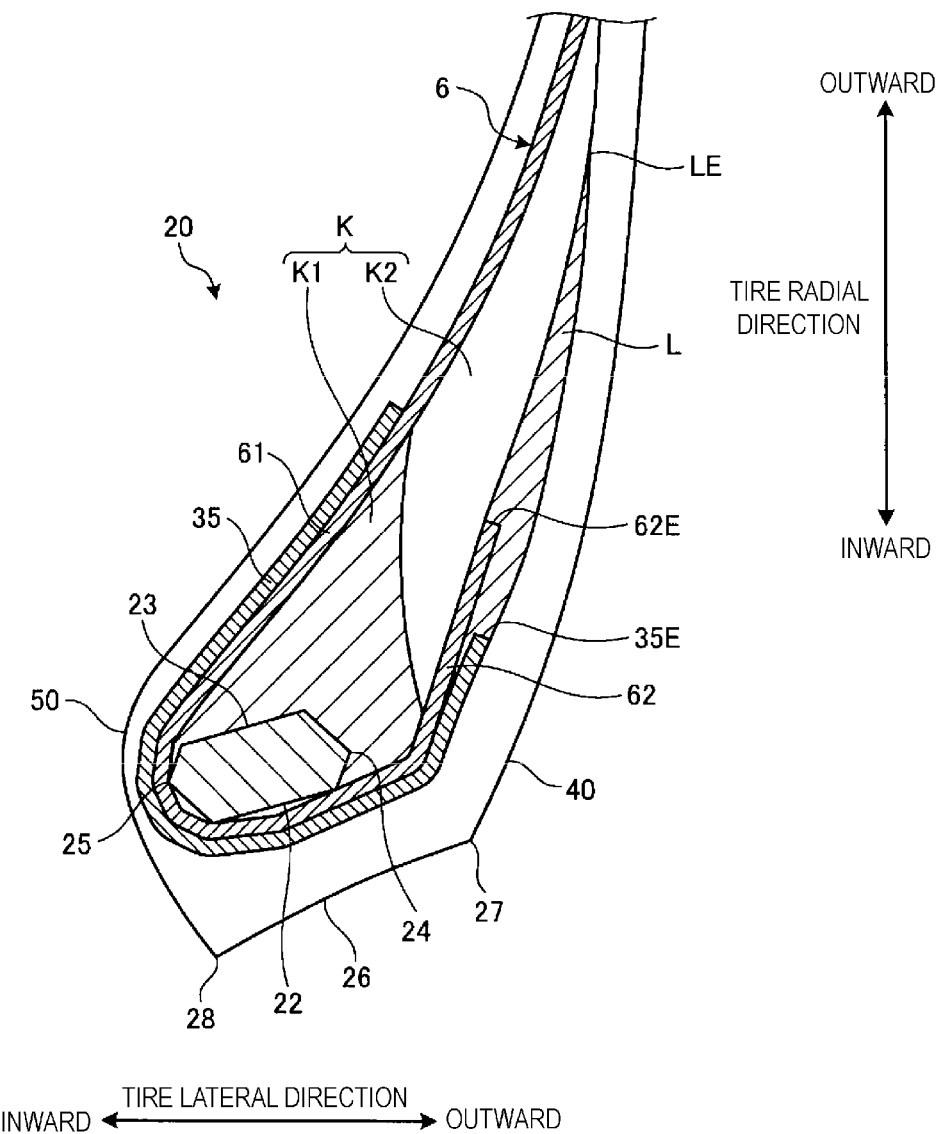
FIG. 2 is a detailed view of portion G of FIG. 1.

FIG. 2 is a detailed view of a portion G of FIG. 1. A steel cord reinforcing layer 35 made of steel cords is disposed in a portion where the carcass 6 folds back around the bead core 21. The steel cord reinforcing layer 35 is disposed in contact with the outer surface of the carcass 6 folded back at the bead core 21 and reinforces the carcass 6. The steel cord reinforcing layer 35 is disposed layered on the carcass 6 on the outer side of the carcass 6 at the portion where the carcass 6 is folded back and, in a similar manner to that of the carcass 6, is folded back around the bead core 21 from in to out in the tire lateral direction and is disposed continuously in the tire circumferential direction. In other words, the steel cord reinforcing layer 35 is located inward of the carcass 6 in the tire lateral direction at the portion where the carcass 6 is located inward from the bead core 21 in the tire lateral direction, and is located outward of the carcass 6 in the tire lateral direction at the portion where the carcass 6 is located outward from the bead core 21 in the tire lateral direction.

Additionally, the bead core 21 formed by winding a bead wire into an annular shape has a shape when viewed in a meridian cross-section that is substantially hexagonal. Specifically, the bead core 21, when viewed overall, has a substantially hexagonal shape and includes an inner circumferential surface 22 and an outer circumferential surface 23, which have a substantially parallel orientation inclined inward in the tire radial direction as they run from outward to inward in the tire lateral direction, a corner portion 24 projecting outward in the tire lateral direction at an outer position in the tire lateral direction, and a corner portion 25 projecting inward in the tire lateral direction at an inner position in the tire lateral direction. Note that the inner circumferential surface 22 is a surface of the bead core 21 facing inward in the tire radial direction and the outer circumferential surface 23 is another surface of the bead core 21 facing outward in the tire radial direction.

In the present embodiment, among the six sides of the hexagonal shape of the bead core 21, when viewed in a meridian cross-section, the side specified as the outer circumferential surface 23 is the longest. Note that the side specified as the inner circumferential surface 22 may be the longest, or the side specified as the outer circumferential surface 23 and the side specified as the inner circumferential surface 22 may be equal in length.

In a similar manner, a bead base portion 26, which is the inner circumferential surface of the bead portion 20, inclines in a direction inward in the tire radial direction as it runs from outward to inward in the tire lateral direction. Note that the inner circumferential surface of the bead portion 20 is a surface of the bead portion 20 facing inward in the tire radial direction. In other words, at the bead base portion 26, a bead toe 28, which is an inner end portion of the bead base portion 26 in the tire lateral direction, is more inclined in a direction inward in the tire radial direction than a bead heel 27, which is an outer end portion of the bead base portion 26 in the tire lateral direction. The bead base portion 26 is provided as an engaging portion that engages and comes into contact with the specified rim when the tire 1 according to the present embodiment is mounted on the specified rim.

In the bead portion 20, a tire outer surface 40 is formed to be curved projecting outward in the tire lateral direction. In other words, the portion of the tire outer surface 40 at the bead portion 20, the outer surface 40 being a surface on the side of the tire 1 exposed to the outside air, is curved projecting outward in the tire lateral direction. The bead heel 27, i.e., one end portion of the bead base portion 26, is the intersection point between the tire outer surface 40 and the bead base portion 26.

In the bead portion 20, a tire inner surface 50 is formed to be curved projecting inward in the tire lateral direction. In other words, the portion of the tire inner surface 50 at the bead portion 20, the inner surface 50 being a surface on the side of the tire 1 filled with air, is curved projecting inward in the tire lateral direction. The bead toe 28, i.e., the other end portion of the bead base portion 26, is the intersection point between the tire inner surface 50 and the bead base portion 26.

Additionally, the bead portion 20 is provided with a bead rubber layer K. At least a portion of the bead rubber layer K is disposed between the carcass body portion 61 and the carcass folded back portion 62. The bead rubber layer K is also known as a bead filler.

The first reinforcing rubber layer L is disposed adjacent to an outer surface of the bead rubber layer K in the tire lateral direction, an outer edge portion 62E of the carcass folded back portion 62 located outward in the tire radial direction, and an outer edge portion 35E of the steel cord reinforcing layer 35 located outward in the tire radial direction. In a meridian cross-section, the first reinforcing rubber layer L extends in the tire radial direction and is in contact with each of the outer surface of the bead rubber layer K in the tire lateral direction, the outer edge portion 62E of the carcass folded back portion 62 located outward in the tire radial direction, and the outer edge portion 35E of the steel cord reinforcing layer 35 located outward in the tire radial direction. The hardness of the first reinforcing rubber layer L is higher than the hardness of the bead rubber layer K (a shock absorbing rubber layer K2 described below) but lower than the hardness of the carcass 6 and the steel cord reinforcing layer 35. Note that hardness is a value measured by a type A durometer in accordance with Japanese Industrial Standards (JIS) K 6253-3:2012.

In the present embodiment, the bead rubber layer K includes a second reinforcing rubber layer K1 located adjacent to the bead core 21 and the shock absorbing rubber layer K2 located adjacent to the second reinforcing rubber layer K1, and the shock absorbing rubber layer K2 being disposed between the carcass body portion 61 and the first reinforcing rubber layer L. The boundary between the second reinforcing rubber layer K1 and the shock absorbing rubber layer K2 extends in the tire radial direction. The first reinforcing rubber layer L is in contact with the shock absorbing rubber layer K2. The outer edge portion 62E of the carcass folded back portion 62 is located adjacent to the shock absorbing rubber layer K2.

The outer edge portion 62E of the carcass folded back portion 62 is disposed outward from the outer edge portion 35E of the steel cord reinforcing layer 35 in the tire radial direction. An outer edge portion LE of the first reinforcing rubber layer L is disposed outward from the outer edge portion 62E of the carcass folded back portion 62 in the tire radial direction.

Figure 3:
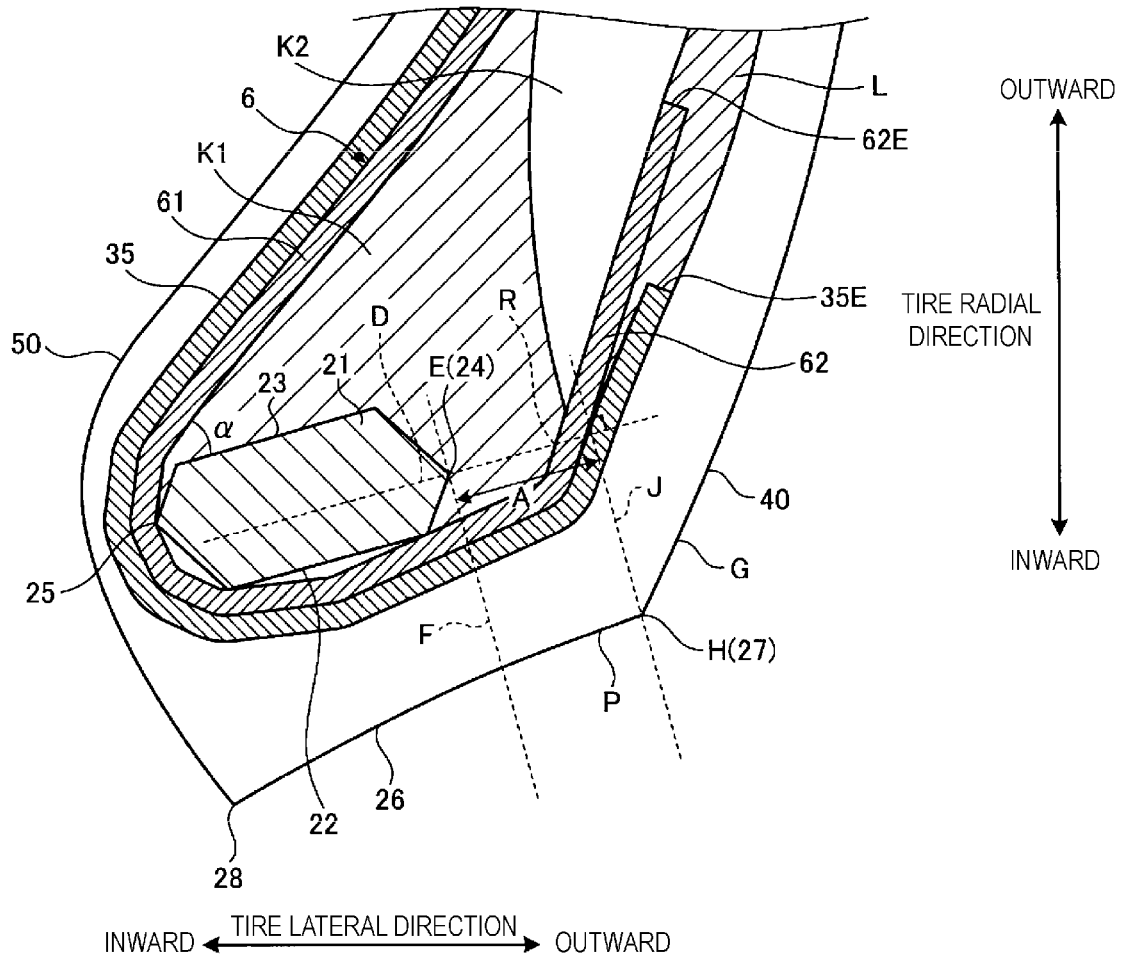
FIG. 3 is an enlarged view of a portion of FIG. 2.

FIG. 3 is an enlarged view of a portion of FIG. 2. Specified values such as respective dimensions of constituents of the bead portion 20 according to the present embodiment will be described below with reference to FIGS. 2 and 3. The specified values described below are specified values when the tire 1 is not mounted on the specified rim. In other words, the specified values are specified values of the tire 1 in a state prior to being mounted on the specified rim and are specified values in a meridian cross-section of the tire 1 after vulcanization molding via a mold. For the sake of convenience, the specified values are in a meridian cross-section of the tire 1 set by the linear distance between imaginary intersection points H (the distance between the imaginary intersection points H of the pair of bead portions 20) described below when the tire is stood up by itself.

As illustrated in FIG. 3, in a meridian cross-section of the bead portion 20, a first line segment D passing through an outermost projecting point E of the bead core 21 in the tire lateral direction and being parallel with the longest side of the bead core 21, a side P of the bead base portion 26 closer to the bead heel 27 where the bead base portion 26 of the bead portion 20 is configured to contact with the specified rim, a curved line G of the tire outer surface 40 where the tire outer surface 40 of the bead portion 20 is located outward from the bead base portion 26 in the tire lateral direction, a first intersection point H of the side P and the curved line G, a second line segment J passing through the first intersection point H and being perpendicular to the first line segment D, and a third line segment F passing through the projecting point E and being perpendicular to the first line segment D are specified.

The projecting point E includes the corner portion 24. The projecting point E, in a meridian cross-section, is a point where the first line segment D which runs through the center of the outermost bead wire in the tire lateral direction of the bead wires of the bead core 21 and being parallel with the longest side of the bead core 21 meets the profile of the bead wires. The longest side is specified by the outer circumferential surface 23. The first intersection point H includes the bead heel 27.

In the present embodiment, a distance A between the second line segment J and the third line segment F is from 4 mm to 12 mm.

Additionally, in the present embodiment, a second intersection point R of the first line segment D and the inner surface of the carcass folded back portion 62 is specified at the second reinforcing rubber layer K1. In other words, the second intersection point R is located adjacent to the second reinforcing rubber layer K1.

In the present embodiment, the complex modulus of the first reinforcing rubber layer L is from 6 MPa to 10 MPa, and the elongation at break of the first reinforcing rubber layer L is from 300% to 450%. The complex modulus of the second reinforcing rubber layer K1 is from 10 MPa to 15 MPa. The complex modulus of the shock absorbing rubber layer K2 is from 2 MPa to 6 MPa. The viscoelastic characteristics are values measured in accordance with JIS K 7244-4:1999 (measurement temperature: 60°, initial strain:

10%, amplitude: ±1%, frequency: 10 Hz, deformation mode: tensile). Elongation at break is the elongation at break according to JIS K 6251:2110.

As described above, according to the present embodiment, the distance A is from 4 mm to 12 mm. This allows an angle α (see FIG. 3) formed by the carcass body portion 61 and the outer circumferential surface 23 of the bead core 21 to be decreased. As a result, in the tire 1 before and after being inflated with air, the amount of change in position of the carcass 6 located near the bead portion 20 can be reduced. This allows the strain acting on the first reinforcing rubber layer L and the bead rubber layer K (shock absorbing rubber layer K2) located adjacent to the outer edge portion 62E of the carcass folded back portion 62 to be reduced, and crack generation from the outer edge portion 62E of the carcass folded back portion 62 to be suppressed.

In general, method of lessening the distance between the pair of bead portions 20 is used to reduce the amount of change in position of the carcass 6 located near the bead portion 20 before and after inflation. However, this method has the drawback of making the bead portions 20 difficult to mount on the specified rim when the tire 1 is inflated with air. According to the present embodiment, crack generation can be suppressed while mountability of the bead portions 20 on the specified rim is maintained.

When the distance A is greater than 12 mm, the volume of the bead rubber layer K increases to a level which deteriorates heat build-up and thus deteriorates the durability of the bead portion 20. When the distance A is less than 4 mm, the angle α cannot be made small enough. As a result, the effect of reducing the strain acting on the first reinforcing rubber layer L and the bead rubber layer K located adjacent to the outer edge portion 62E of the carcass folded back portion 62 cannot be obtained. Thus, the distance A is preferably from 4 mm to 12 mm, more preferably from 4 mm to 8 mm, and even more preferably from 5 mm to 7 mm.

Additionally, in the present embodiment, the complex modulus of the first reinforcing rubber layer L is from 6 MPa to 10 MPa, and the elongation at break of the first reinforcing rubber layer L is from 300% to 450%. This allows the strain acting on the first reinforcing rubber layer L located adjacent to the outer edge portion 62E of the carcass folded back portion 62 to be reduced, the elongation at break to be maintained at a certain level, and crack generation in the first reinforcing rubber layer L and the bead rubber layer K originating at the outer edge portion 62E of the carcass folded back portion 62 to be suppressed.

When the complex modulus is greater than 10 MPa, the elongation at break is less than 300%. This increases the possibility of crack generation in the first reinforcing rubber layer L and the bead rubber layer K originating at the outer edge portion 62E. When the complex modulus is less than 6 MPa, the strain acting on the first reinforcing rubber layer L located adjacent to the outer edge portion 62E of the carcass folded back portion 62 increases. This also increases the possibility of crack generation in the first reinforcing rubber layer L and the bead rubber layer K. By the physical properties of the first reinforcing rubber layer L being within the ranges described above, crack generation can be suppressed.

Additionally, in the present embodiment, the complex modulus of the second reinforcing rubber layer K1 is from 10 MPa to 15 MPa. When the complex modulus of the second reinforcing rubber layer K1 is less than 10 MPa, the fastening force against the rim wheel at the carcass folded back portion 62 is weak, and the bead portion 20 may burst due to drawing out of the carcass 6. When the complex modulus of the second reinforcing rubber layer K1 is greater than 15 MPa, a decrease in the elongation at break of the second reinforcing rubber layer K1 causes an increase in the possibility of crack generation in the second reinforcing rubber layer K1 itself which leads the bead portion 20 bursting. Accordingly, the complex modulus of the second reinforcing rubber layer K1 is preferably from 10 MPa to 15 MPa.

Additionally, in the present embodiment, the complex modulus of the shock absorbing rubber layer K2 is from 2 MPa to 6 MPa. When the complex modulus of the shock absorbing rubber layer K2 is greater than 6 MPa, the function of mitigating the collapse-deformation of the carcass body portion 61 reduces, the strain acting on the shock absorbing rubber layer K2 located adjacent to the outer edge portion 62E of the carcass folded back portion 62 increases, and the possibility of crack generation in the first reinforcing rubber layer L and the shock absorbing rubber layer K2 located adjacent to the outer edge portion 62E of the carcass folded back portion 62 increases. When the complex modulus of the shock absorbing rubber layer K2 is less than 2 MPa, the collapse-deformation of the carcass body portion 61 itself increases. As a result, the strain acting on the shock absorbing rubber layer K2 located adjacent to the outer edge portion 62E of the carcass folded back portion 62 increases, and the possibility of crack generation in the first reinforcing rubber layer L and the shock absorbing rubber layer K2 increases. Accordingly, the complex modulus of the shock absorbing rubber layer K2 is preferably from 2 MPa to 6 MPa.

Additionally, in the present embodiment, the second intersection point R of the first line segment D and the inner surface of the carcass folded back portion 62 is located adjacent to the second reinforcing rubber layer K1, which has a higher hardness than the shock absorbing rubber layer K2. When the second intersection point R is located adjacent to the shock absorbing rubber layer K2, the fastening force of the carcass folded back portion 62 is weak, and the bead portion 20 may burst due to drawing out of the carcass 6. When the rubber located adjacent to the second intersection point R is the second reinforcing rubber layer K1, which has a relatively higher hardness than the shock absorbing rubber layer K2, the strain generated between the rim wheel and the bead core 21 is reduced, and heat build-up of the bead portion 20 is not deteriorated.

EXAMPLES

FIG. 4 is a table listing results of performance tests of the tires 1. In relation to the tires 1 described above, performance evaluation tests conducted on tires 1 of conventional examples and comparative examples and the tires 1 according to embodiments of the present technology will be described below.

The performance evaluation tests were conducted on carcass turned-up separation resistance performance, which indicates resistance to crack generation in the bead portion 20 originating at the carcass folded back portion 62, and bead burst possibility, which indicates the possibility of the bead portion 20 bursting.

In the performance evaluation tests, the tires 1 with a size of 275/70 R22.5 were mounted on the rim wheel of a 15° tapered specified rim defined by JATMA, inflated to an air pressure 75% of a specified air pressure defined by JATMA, and loaded with 1.4 times a specified load defined by JATMA, then run on an indoor drum testing machine at a running speed of 49 km/h until the tires 1 failed. The running distance until failure was evaluated.

As listed in FIG. 4, the evaluation test was conducted on the tires 1 of Conventional Examples 1, 2, the tires 1 of Comparative Examples 1 to 4, and the tires 1 of Examples 1 to 3, which are embodiments of the present technology. These tires 1 each have a different configuration for the bead portions 20. As listed in FIG. 4, in the tire 1 of Conventional Example 1, the distance A is outside the technical scope of the present technology, and in the tire 1 of Conventional Example 2, the constituents are all outside the technical scope of the present technology. The tires 1 of Comparative Examples 1 to 4 all have a constituent outside the technical scope of the present technology.

In the evaluation of carcass turned-up separation resistance performance, results of the evaluation are expressed as index values with Conventional Example 1 being assigned as the reference (100). In this evaluation, larger values indicated superior carcass turned-up separation resistance performance.

As listed in FIG. 4, the tires 1 of Examples 1 to 3 have excellent carcass turned-up separation resistance performance and bead burst possibility compared to the tires 1 of the conventional examples and comparative examples. In other words, the tires 1 of Examples 1 to 3 can provide effective suppression of crack generation from the edge of the carcass folded back portion 62.

The invention claimed is:

1. A pneumatic tire mountable on a 15° tapered specified rim, the pneumatic tire comprising:
   a pair of bead portions disposed on either side of a tire equatorial plane in a tire lateral direction;
   a bead core provided in each of the pair of bead portions;
   a carcass supported by the pair of bead cores, the carcass comprising a carcass body portion and a carcass folded back portion formed by the carcass folding back at the bead core;
   a steel cord reinforcing layer disposed on an outer surface of the carcass folded back at the bead core;
   a bead rubber layer with at least a portion thereof disposed between the carcass body portion and the carcass folded back portion; and
   a first reinforcing rubber layer located adjacent to an outer edge portion of the steel cord reinforcing layer located outward in a tire radial direction and an outer edge portion of the carcass folded back portion located outward in the tire radial direction, the first reinforcing rubber layer extending outward in the tire radial direction;
   the bead rubber layer comprising a second reinforcing rubber layer located adjacent to the bead core and a shock absorbing rubber layer located adjacent to the second reinforcing rubber layer, the shock absorbing rubber layer disposed between the carcass body portion and the first reinforcing rubber layer;
   when the pneumatic tire being not mounted on the specified rim,
   a distance from a second line segment to a third line segment being from 4 mm to 12 mm,
   a complex modulus of the first reinforcing rubber layer being from 6 MPa to 10 MPa,
   an elongation at break of the first reinforcing rubber layer being from 300% to 450%, and
   a complex modulus of the second reinforcing rubber layer being from 10 MPa to 15 MPa, and a complex modulus of the shock absorbing rubber layer being from 2 MPa to 6 MPa,
   wherein a first line segment passing through an outermost projecting point of the bead core in the tire lateral direction and being parallel with a longest side of the bead core, a side of a bead base portion closer to a bead heel, where the bead base portion is a portion of the bead portion and configured to come into contact with the specified rim, a curved line of a tire outer surface, where the tire outer surface is a portion of the bead portion and is located outward from the bead base portion in the tire lateral direction, a first intersection point of the side and the curved line, the second line segment passing through the first intersection point and being perpendicular to the first line segment, and the third line segment passing through the projecting point and being perpendicular to the first line segment are specified, and
   wherein the bead core is in contact with the carcass body portion at an innermost corner portion of the bead core in the tire lateral direction and is spaced away from the folded back portion of the carcass at the projecting point by the distance less a thickness of the carcass at the folded back portion taken along a line perpendicular to the second line segment and the third line segment.

2. The pneumatic tire according to claim 1, wherein a second intersection point of the first line segment and the carcass folded back portion is specified at the second reinforcing rubber layer.

3. The pneumatic tire according to claim 1, wherein the bead core has an asymmetric shape.

4. The pneumatic tire according to claim 3, wherein the asymmetric shape is an asymmetric hexagon with no axes of symmetry.

* * * * *